(12) United States Patent
Le-Khac

(10) Patent No.: US 6,797,665 B2
(45) Date of Patent: Sep. 28, 2004

(54) DOUBLE-METAL CYANIDE CATALYSTS FOR PREPARING POLYETHER POLYOLS

(75) Inventor: Bi Le-Khac, West Chester, PA (US)

(73) Assignee: Bayer Antwerpen, Antwerp (BE)

( * ) Notice: Subject to any disclaimer, the term of this patent is extended or adjusted under 35 U.S.C. 154(b) by 104 days.

(21) Appl. No.: 10/143,234

(22) Filed: May 10, 2002

(65) Prior Publication Data

US 2003/0211935 A1 Nov. 13, 2003

(51) Int. Cl.$^7$ ................................. B01J 27/26
(52) U.S. Cl. ....................... 502/175; 502/200; 502/159; 502/172; 423/367
(58) Field of Search ................ 502/175, 200, 502/159, 172; 423/367

(56) References Cited

U.S. PATENT DOCUMENTS

| | | | |
|---|---|---|---|
| 3,278,457 A | 10/1966 | Milgrom | |
| 3,278,458 A | 10/1966 | Belner | |
| 3,278,459 A | 10/1966 | Herold | |
| 3,404,109 A | 10/1968 | Milgrom | |
| 3,427,256 A | 2/1969 | Milgrom | |
| 3,538,043 A | 11/1970 | Herold | |
| 3,829,505 A | 8/1974 | Herold | |
| 3,900,518 A | 8/1975 | Milgrom | |
| 3,941,849 A | 3/1976 | Herold | |
| 4,472,560 A | 9/1984 | Kuyper et al. ............... | 526/120 |
| 4,477,589 A | 10/1984 | van der Hulst et al. ..... | 502/169 |
| 5,145,883 A | 9/1992 | Saito et al. .................. | 521/172 |
| 5,158,922 A | 10/1992 | Hinney et al. .............. | 502/175 |
| 5,223,583 A | 6/1993 | Higuchi et al. ............. | 525/404 |
| 5,470,813 A | 11/1995 | Le-Khac ...................... | 502/175 |
| 5,482,908 A | 1/1996 | Le-Khac ...................... | 502/156 |
| 5,545,601 A | 8/1996 | Le-Khac ...................... | 502/156 |
| 5,714,428 A | 2/1998 | Le-Khac ...................... | 502/159 |
| 6,013,596 A | 1/2000 | Le-Khac et al. ............ | 502/175 |
| 6,323,375 B1 | 11/2001 | Hofmann et al. ........... | 568/613 |

FOREIGN PATENT DOCUMENTS

GB          1146660          3/1969

Primary Examiner—Elizabeth D. Wood
(74) Attorney, Agent, or Firm—Joseph C. Gil; John E. Mrozinski, Jr.

(57) ABSTRACT

The invention relates to double-metal cyanide catalysts for preparing polyols by the polyaddition of alkylene oxides on to starter compounds containing active hydrogen atoms, wherein the DMC catalysts are composed of: a) at least one double-metal cyanide compound; b) at least one organic complexing ligand; and, optionally, c) at least one functionalized polymer, wherein the organic complexing ligand is a mixture of a $C_3$–$C_7$ aliphatic alcohol and from about 2 to about 98 mole %, based on the total amount of organic complexing ligand, of a cyclic, aliphatic, cycloaliphatic or aromatic ketone. The DMC catalysts of the present invention have increased activity compared to known catalysts. Additionally, the DMC catalysts of the present invention can be used to prepare polyols with reduced high molecular weight components.

18 Claims, No Drawings

DOUBLE-METAL CYANIDE CATALYSTS FOR PREPARING POLYETHER POLYOLS

TECHNICAL FIELD OF THE INVENTION

The invention relates to double-metal cyanide ("DMC") catalysts for preparing polyether polyols by the polyaddition of alkylene oxides on to starter compounds containing active hydrogen atoms.

BACKGROUND OF THE INVENTION

DMC catalysts for the polyaddition of alkylene oxides on to starter compounds containing active hydrogen atoms are known. DMC catalysts can be used to produce polyols which have low unsaturation levels compared with basic (KOH) catalysts. DMC catalysts can be used to produce polyether, polyester and polyetherester polyols which are useful in polyurethane coatings, elastomers, sealants, foams and adhesives.

DMC catalysts are typically obtained by reacting an aqueous solution of a metal salt (for example, zinc chloride) with an aqueous solution of a metal cyanide salt (for example, potassium hexacyanocobaltate), in the presence of an organic complexing ligand. The preparation of typical DMC catalysts is described, for example, in U.S. Pat. Nos. 3,427,256; 3,289,505; and 5,158,922.

Organic complexing ligands are needed in the preparation of DMC catalysts in order to obtain favorable catalytic activity. While water-soluble ethers (e.g., dimethoxyethane ("glyme") or diglyme) and alcohols (for example, isopropyl alcohol or tert-butyl alcohol) are commonly used as the organic complexing ligand, other general classes of compounds have been described which are useful as the organic complexing ligand. For example, U.S. Pat. Nos. 4,477,589; 3,829,505; and 3,278,459 disclose DMC catalysts containing organic complexing ligands selected from alcohols, aldehydes, ketones, ethers, esters, amides, nitrites or sulphides.

DMC catalysts having increased activity for epoxide polymerization are known. For example, U.S. Pat. No. 5,470,813 discloses DMC catalysts which have higher activities compared with conventional DMC catalysts. U.S. Pat. Nos. 5,482,908 and 5,545,601 disclose DMC catalysts having increased activity which are composed of a functionalized polymer such as polyether.

Polyols produced in the presence of DMC catalysts which have increased activity can also have increased high (for example, greater than 400,000) molecular weight components. High molecular-weight components can negatively impact the product produced from the polyol. For example, polyols which have increased high molecular weight components can process poorly resulting in, for example, tight foams or foams which can settle or collapse. Various approaches have been proposed for addressing this problem. Such approaches include, for example, re-formulation of the polyurethane or removal of the component from the polyol after formation. These approaches, however, are not cost effective.

U.S. Pat. No. 6,013,596 discloses a DMC catalyst having increased activity and reduced levels of high molecular weight components. The DMC catalyst of this patent is composed of a $C_3$–$C_5$ aliphatic alcohol and from about 5 to about 95 mol. %, based on the total amount of the organic complexing ligand, of a cyclic, bidentate compound selected from lactams and lactones.

There remains, however, a need for DMC catalysts which have increased activity compared to catalysts known in the art which can be used to produce polyols with reduced high molecular weight components.

SUMMARY OF THE INVENTION

DMC catalysts of the present invention are composed of: a) at least one DMC compound; b) at least one organic complexing ligand; and, optionally, c) at least one functionalized polymer, wherein the organic complexing ligand b) is a mixture of a $C_3$–$C_7$ aliphatic alcohol and from about 2 to about 98 mole %, based on the total amount of organic complexing ligand, of a cyclic, aliphatic, cycloaliphatic or aromatic ketone.

DMC catalysts of the present invention have increased activity compared to catalysts known in the art. Additionally, polyols produced in the presence of the DMC catalysts of the present invention have reduced levels of high (having a number average molecular weight greater than 400,000) molecular weight components.

DESCRIPTION OF THE INVENTION

The present invention relates to a DMC catalyst composed of: a) at least one DMC compound; b) at least one organic complexing ligand; and c) optionally, at least one functionalized polymer, wherein the organic complexing ligand b) is a mixture of a $C_3$–$C_7$ aliphatic alcohol and from about 2 to about 98 mole %, based on the total amount of organic complexing ligand, of a cyclic, aliphatic, cycloaliphatic or aromatic ketone.

DMC compounds useful in the present invention are the reaction products of water-soluble metal salts and water-soluble metal cyanide salts. Examples of suitable water-soluble metal salts useful in the present invention include zinc chloride, zinc bromide, zinc acetate, zinc acetylacetonate, zinc benzoate, zinc nitrate, iron(II) sulfate, iron(II) bromide, iron(II) chloride, cobalt(II) chloride cobalt (II) thiocyanate, nickel(II) chloride, nickel(II) nitrate and mixtures thereof. Preferably, zinc halides are used in the present invention.

Examples of water-soluble metal cyanide salts useful in the present invention include potassium hexacyanocobaltate (III), potassium hexacyanoferrate(II), potassium hexacyanoferrate(III), calcium hexacyanocobaltate(III) and lithium hexacyanocobaltate(III). Preferably, potassium hexacyanocobaltates are used in the present invention.

Examples of suitable DMC compounds useful in the present invention include zinc hexacyanocobaltate(III), zinc hexacyanoiridate(III), zinc hexacyanoferrate(III) and cobalt (II) hexacyanocobaltate(III). Further examples of suitable DMC compounds useful in the present invention are disclosed in U.S. Pat. No. 5,158,922, the teachings of which are incorporated herein by reference. Zinc hexacyanocobaltates are preferred DMC compounds of the present invention.

Organic complexing ligands of the present invention are mixtures of at least one $C_3$–$C_7$ aliphatic alcohol and at least one cyclic, aliphatic, cycloaliphatic or aromatic ketone.

Examples of suitable $C_3$–$C_7$ aliphatic alcohols useful in the present invention include n-propyl alcohol, isopropyl alcohol, isobutyl alcohol, tert-butyl alcohol, tert-amyl alcohol and mixtures thereof. Preferably, $C_3$–$C_7$ aliphatic alcohols used in the present invention are branched alcohols. More preferably, tert-butyl alcohols are used in the present invention.

Examples of suitable cyclic, aliphatic, cycloaliphatic or aromatic ketones useful in the present invention include methylethylketone, 3,3-dimethoxy-2-butanone, cyclopentanone, and cyclobutanone. Preferably, cyclopentanones are used in the present invention. More preferably, 3,3-dimethoxy-2-butanones are used in the present invention.

Both the $C_3$–$C_7$ aliphatic alcohols and the ketones are needed to produce DMC catalysts which have increased activity compared to catalysts known in the art which can be used to produce polyols having reduced high molecular weight components. While DMC catalysts having a $C_3$–$C_7$ aliphatic alcohol as the organic complexing ligand may have increased activity, the polyols produced from such DMC catalysts can contain undesirable levels of high molecular weight components. Also, DMC catalysts which have only a ketone as the organic complexing ligand tend to have relatively low activity and/or produce polyols with broad molecular weight distributions and high viscosities.

The relative amounts of $C_3$–$C_7$ aliphatic alcohol and ketone used in the present invention can vary. A skilled person can control catalyst activity, polyol viscosity and the like by varying these amounts. Ketone is typically present in an amount from about 2 to about 98 mole %, preferably, from about 5 to about 95 mole %, more preferably, from about 10 to about 50 mole %, based on the total amount of organic complexing ligand.

DMC catalysts of the present invention can optionally include at least one of the same or different, or a combination or combinations of the same and different, functionalized polymer. "Functionalized polymer" is defined as a polymer or its salt which contains one or more functional groups including oxygen, nitrogen, sulfur, phosphorus or halogen.

Examples of functionalized polymers useful in the present invention include: polyethers; polyesters; polycarbonates; polyalkylene glycol sorbitan esters; polyalkylene glycol glycidyl ethers; polyacrylamides; poly(acrylamide-co-acrylic acids), polyacrylic acids, poly(acrylic acid-co-maleic acids), poly(N-vinylpyrrolidone-co-acrylic acids), poly (acrylic acid-co-styrenes) and their salts; maleic acids, styrenes and maleic anhydride copolymers and their salts; polyacrylonitriles; polyalkyl acrylates; polyalkyl methacrylates; polyvinyl methyl ethers; polyvinyl ethyl ethers; polyvinyl acetates; polyvinyl alcohols; poly-N-vinylpyrrolidones; polyvinyl methyl ketones; poly(4-vinylphenols); oxazoline polymers; polyalkyleneimines; hydroxyethylcelluloses; polyacetals; glycidyl ethers; glycosides; carboxylic acid esters of polyhydric alcohols; bile acids and their salts, esters or amides; cyclodextrins; phosphorus compounds; unsaturated carboxylic acid esters; and ionic surface- or interface-active compounds.

Other suitable functionalized polymers useful in the present invention are described in U.S. Pat. No. 5,714,428, the teachings of which are incorporated herein by reference.

Polyethers are preferred functionalized polymers useful in the present invention. DMC catalysts which include polyether as the functionalized polymer are disclosed in U.S. Pat. Nos. 5,482,908 and 5,545,601, the teachings of which are incorporated herein by reference. Polyether polyols are more preferred functionalized polymers useful in the present invention.

When used, functionalized polymers are present in the DMC catalyst of the present invention in an amount in the range of from about 2 to about 80 wt. %, preferably, from about 5 to about 70 wt. %, more preferably, from about 10 to about 60 wt. %, based on the total amount of the DMC catalyst.

The present invention also relates to a method for producing DMC catalysts of the present invention. A DMC catalyst of the present invention is preferably prepared in an aqueous solution, at a temperature within the range of from about room temperature to about 80° C., by reacting a metal salt, (for example, zinc chloride, employed in a stoichiometric excess (at least 50 mol. %, based on the molar amount of metal cyanide salt)), with a metal cyanide salt, (for example, potassium hexacyanocobaltate), in the presence of an organic complexing ligand which is a mixture of a $C_3$–$C_7$ aliphatic alcohol and from about 2 to about 98 mole %, based on the total amount of organic complexing ligand, of a cyclic, aliphatic, cycloaliphatic or aromatic ketone, thereby forming a suspension of DMC catalyst.

The organic complexing ligand is present in the aqueous solution of the metal salt and/or the aqueous solution of the metal cyanide salt or it is added to the DMC catalyst suspension immediately following precipitation of the DMC compound. It is generally preferred to pre-mix the $C_3$–$C_7$ aliphatic alcohol or the ketone or both with either or both aqueous solution(s) before combining the reactants. In one preferred method of the present invention, the ketone is included in one or both of the aqueous reactant solutions, i.e., in either the aqueous metal salt (e.g., zinc chloride) solution and/or the aqueous metal cyanide salt (e.g., potassium hexacyanocobaltate) solution before the two solutions are combined.

The reactants are combined by any of the mixing methods known in the art, for example, simple mixing, high-shear mixing or homogenization, to produce a suspension which contains the DMC catalyst. Preferably, the reactants are combined by homogenization or with high-shear stirring.

The DMC catalyst is isolated from suspension by known techniques, such as centrifugation, filtration, filtration under pressure, decanting, phase separation or aqueous separation. See, for example, U.S. Pat. Nos. 5,470,813; 5,482,908; 5,714,428; and 6,013,596, the teachings of which are incorporated herein by reference.

The DMC catalyst is washed with an aqueous mixture of a $C_3$–$C_7$ aliphatic alcohol. Optionally, this washing mixture includes at least one of the same or different, or a combination or combinations of the same and different, functionalized polymer. The DMC catalyst is isolated again and then washed again with a $C_3$–$C_7$ aliphatic alcohol or an aqueous mixture containing the alcohol and/or functionalized polymer. Preferably, water is not used in the final wash of the DMC catalyst.

The present invention also relates to the use of DMC catalysts according to the invention in a process for the preparation of polyols, particularly, polyether polyols, by the polyaddition of one or more alkylene oxides on to one or more starter compounds containing active hydrogen atoms.

Alkylene oxides preferably used in the present invention include ethylene oxides, propylene oxides, butylene oxides and mixtures thereof. The build-up of the polyether chains by alkoxylation can be accomplished by using only one monomeric epoxide, or randomly or blockwise with 2 or 3 different monomeric epoxides.

Starter compounds containing active hydrogen atoms which are used in the present invention are compounds with number average molecular weights between 18 to 2,000, preferably, between 32 to 2,000, with 1 to 8 hydroxyl groups. Examples of such starter compounds are ethylene glycol, diethylene glycol, triethylene glycol, 1,2-propylene glycol, 1,4-butanediol, hexamethylene glycol, bisphenol A, trimethylolpropane, glycerol, pentaerythritol, sorbitol, sucrose, degraded starch and water.

A starter compound containing active hydrogen atoms which has been prepared by conventional alkali catalysis from a low molecular weight starter compound (such as mentioned above) and is an oligomeric alkoxylation product with a number average molecular weight of 200 to 2,000 is preferably used in the present invention.

Other monomers which will co-polymerize with an epoxide in the presence of a DMC catalyst can be included in the process of the present invention to produce other types of epoxide polymers. Any of the co-polymers known in the art made using conventional DMC catalysts can be produced with the DMC catalysts of the present invention. See, for example, U.S. Pat. Nos. 3,278,457; 3,404,109; 5,145,883; 3,538,043; 5,223,583; 5,145,883; 4,472,560; 3,941,849; and 3,900,518, the teachings of which are incorporated herein by reference.

The polyaddition of alkylene oxides on to starter compounds containing active hydrogen atoms in the presence of the DMC catalysts of the present invention is carried out at a temperature between 20 and 200° C., preferably, between 40 and 180° C., more preferably, between 50 and 150° C.

The reaction can be carried out under an overall pressure of 0.0001 to 20 bar. The polyaddition can be carried out in bulk or an inert organic solvent, such as toluene and/or tetrahydrofuran ("THF"). The amount of solvent is usually 10 to 30 wt. %, based on the total weight of polyol to be prepared.

The DMC catalyst concentration is chosen such that sufficient control of the polyaddition reaction is possible under the given reaction conditions. The catalyst concentration is typically in the range from 0.0005 wt. % to 1 wt. %, preferably, 0.001 wt. % to 0.1 wt. %, more preferably, 0.001 to 0.0025 wt. %, based on the total weight of polyol to be prepared.

The number average molecular weight of the polyol prepared by the process of the present invention is in the range of from about 500 to about 100,000 g/mol, preferably, 1,000 to 12,000 g/mol, more preferably, 2,000 to 8,000 g/mol. Polyols prepared by the process of the present invention have average hydroxyl functionalities of from about 1 to 8, preferably, from about 2 to 6, and more preferably, from about 2 to 3. The polyaddition can be carried out continuously or in a batch or semi-batch process.

DMC catalysts of the present invention can be used to produce polyols with reduced high molecular weight components compared to known DMC catalysts. The amount of high molecular weight component is quantified by any suitable method. A particularly convenient way to measure this component is by gel permeation chromatography (GPC). A suitable technique is described in Example A below as well as in U.S. Pat. No. 6,013,596, the teachings of which are incorporated herein by reference.

As the Examples below illustrate, polyols made with the DMC catalysts of the present invention have reduced high molecular weight components compared to polyols made with known DMC catalysts.

The following examples merely illustrate the invention. Those skilled in the art will recognize many variations that are within the spirit of the invention and scope of the claims.

EXAMPLES

Catalyst Preparation

Example 1

Preparation of a DMC Catalyst with Methyl Ethyl Ketone (MEK) and Tert-butyl Alcohol (TBA)

MEK (50 ml) and TBA (50 ml) were mixed in a first beaker (Solution 1). Aqueous zinc chloride solution (120 g of 62.5 wt. % $ZnCl_2$) was diluted with deionized water (230 g) and Solution 1 (50 ml) in a one-liter second beaker (Solution 2). Potassium hexacyanocobaltate (7.5 g) was dissolved in a third beaker with deionized water (100 ml) and Solution 1 (20 ml) (Solution 3). Solution 4 was prepared by dissolving a 1000 mol. wt. polyoxypropylene diol (8.0 g) in deionized water (50 ml) and tetrahydrofuran (THF) (2 ml). Solution 3 was added to Solution 2 over 35 min. while homogenizing at 20% of maximum intensity. Following the addition, homogenization continued at 40% intensity for 10 min. The homogenizer was stopped. Solution 4 was added, followed by slow stirring for 3 min.

The reaction mixture was filtered at 40 psig. through a 0.45 um nylon membrane. The catalyst cake was re-slurried in a mixture of tert-butyl alcohol (130 ml) and deionized water (55 ml) and was homogenized at 40% intensity for 10 min. The homogenizer was stopped. More 1000 mol. wt. polyoxypropylene diol (5 g) dissolved in THF (2 g) was added and the mixture was stirred slowly for 3 min. The catalyst was isolated as described above. The cake was re-slurried in tert-butyl alcohol (185 ml) and homogenized as described above. More 1000 mol. wt. diol (3 g) in THF (2 g) was added and the product was isolated in the typical fashion. The resulting catalyst residue was dried in a vacuum oven at 60° C., 30 in. (Hg) to constant weight.

Example 2

Preparation of a DMC Catalyst with MEK and TBA

The procedure of Example 1 was followed, except that the MEK (25 ml) and the TBA (75 ml) were mixed in a first beaker (Solution 1).

Example 3

Preparation of a DMC Catalyst with Cyclopentanone and TBA

The procedure of Example 1 was followed, except that cyclopentanone (25 ml) and TBA (75 ml) were mixed in a first beaker (Solution 1).

Example 4

Preparation of a DMC Catalyst with Cyclopentanone and TBA

The procedure of Example 1 was followed, except that cyclopentanone (10 ml.) and TBA (90 ml.) were mixed in a first beaker (Solution 1).

Example 5

Preparation of a DMC Catalyst with Cyclobutanone and TBA

The procedure of Example 4 was followed, except that the cyclobutanone (10 ml) and the tert-butyl alcohol (90 ml) were mixed in the first beaker (Solution 1).

Example 6

Preparation of a DMC Catalyst with 3,3 Dimethoxy-2-butanone and TBA

The procedure of Example 1 was followed, except that 3,3dimethoxy-2-butanone (10 ml) and TBA (90 ml) were mixed in a first beaker (Solution 1).

Example 7

Preparation of a DMC Catalyst with 3,3 Dimethoxy-2-butanone and TBA

The procedure of Example 6 was followed, except that the 3,3dimethoxy-2-butanone (7.5 ml) and the tert-butyl alcohol (92.5 ml) were mixed in a first beaker (Solution 1).

Example 8 (Comparison)
Preparation of a DMC Catalyst with TBA and N-methyl-2-pyrrolidone ("NMP")

The procedure of Example 1 was followed, except that a 10/100 volume mixture of N-methyl-2-pyrrolidone and tert-butyl alcohol was used in Solution 1. This catalyst was prepared essentially by the method of U.S. Pat. No. 6,013,596.

Example 9 (Comparison)
Preparation of a DMC Catalyst with TBA

The procedure of Example 1 was followed, except 100% TBA in Solution 1 was used. This catalyst was prepared essentially by the method of U.S. Pat. No. 5,482,908.

Evaluation of Catalysts: Polyol Synthesis
General Procedure

Typical 6K polyoxypropylene triols were prepared by adding propylene oxide over 4 hours to an activated mixture containing the zinc hexacyanocobaltate catalyst and a propoxylated glycerin starter (hydroxyl number=240 mg KOH/g). Catalyst levels of 30–150 ppm (see Table 1) were used. The hydroxyl number and viscosity of each product was measured by standard methods. A GPC technique (See Example A) was used to measure the amount of polyol component having a number average molecular weight (Mn) from 200K–400K and >400K. The amount present (in ppm) was recorded in Table 1. "N.D." means "none detected".

Example A
Measurement of High Molecular Weight Polyol Component by Gel Permeation Chromatography (GPC)

The molecular weight of the high molecular weight component of the polyol samples was quantified by comparing elution times in a GPC column with that of polystyrene samples of known molecular weights. The fraction of the sample having a number average molecular weight (Mn) of 200,000–400,000 and greater than 400,000 was then determined by standard methods.

A Jordi Gel DVB $10_3$ angstrom column, 10×250 mm, 5 micron particle size, was employed with a mobile phase made up of tetrahydrofuran. The detector was a Varex Model IIA evaporative light scanning detector. Polystyrene stock solutions were made from polystyrenes of different molecular weights by dilution with tetrahydrofuran to form standards containing 2, 5, and 10 mg/L of polystyrene. Samples were prepared by weighing 0.1 g of polyether polyol into a one-ounce bottle and adding tetrahydrofuran to the sample to adjust the total weight of the sample and solvent to 10.0 g. Samples of the calibration solutions were sequentially injected into the GPC column. Duplicates of each polyether polyol sample were then injected, followed by a re-injection of the various polystyrene standards. The peak areas for the standards are electronically integrated and the electronically integrated peaks for the two sets of each candidate polyol were electronically integrated and averaged.

For each sample, the fraction of material having Mn of 200,000–400,000 and >400,000 was calculated and reported.

TABLE 1

Catalyst Elemental and High Molecular Weight Characterization

| | Catalyst Ex.# | | | | | | | | |
|---|---|---|---|---|---|---|---|---|---|
| | 1 | 2 | 3 | 4 | 5 | 6 | 7 | 8* | 9* |
| Catalyst (ppm) | 100 | 100 | 150 | 100 | 100 | 150 | 100 | 100 | 30 |
| Co-Ligand | MEK | MEK | CPN | CPN | CBN | DMBN | DMBN | NMP | None |
| Co-Ligand (vol. % in solution 1) | 50 | 25 | 25 | 10 | 10 | 10 | 7.5 | 9 | 0 |
| OH# (mg KOH/g) | 31.6 | 31 | 32.1 | 30.7 | 30.1 | 30.9 | 31 | 29.9 | 29.9 |
| viscosity (cps) | 1030 | 1089 | 969.2 | 1063 | 1063 | 1087 | 1081 | 1087 | 1079 |
| HMW Polyol Component 200 k–400 K (ppm) | 25 | 57 | 52 | 88 | 127 | 43 | 36 | 102 | 108 |
| >400 K (ppm) | 7 | 10 | ND | 12 | 35 | 11 | ND | 21 | 49 |

*Comparison
MEK = methylethylketone; CPN = cyclopentanone; CBN = cyclobutanone; DMBN = 3,3-dimethoxy-2-butanone; NMP = N-methyl-2-pyrrolidone
HMW = high molecular weight (by GPC)

What is claimed is:

1. A double-metal cyanide catalyst comprising;
   a) at least one double-metal cyanide compound;
   b) at least one organic complexlng ligand; and
   c) optionally, at least one functionalized polymer;
   wherein the organic complexing ligand is a mixture of tert-butyl alcohol and from about 2 to about 98 mole %, based on the total amount of organic complexing ligand, of methylethylketone.

2. The double-metal cyanide catalyst according to claim 1, wherein the double-metal cyanide compound is zinc hexacyanocobaltate (III).

3. The double-metal cyanide catalyst according to claim 1, wherein the double-metal cyanide catalyst comprises from about 2 to about 98 wt. %, based on the total night of the double-metal cyanide catalyst, of funtionalized polymer.

4. The double-metal cyanide catalyst according to claim 1, wherein the functionalized polymer is a polyether.

5. A double-metal cyanide catalyst comprising:
   a) at least one double-metal cyanide compound;
   b) at least one organic complexing ligand; and
   c) optionally, at least one functionalized polymer which is a polyether; polyester; polycarbonate; polymalkylene glycol sorbitan ester; polymalkylene glycol glycidyl ether; polyacrylamide; poly(acrylamide-co-acrylic acid, polyacrylic acid, poly(acrylic acid-co-maleic acid), poly(N-vinylpyrrolidone-co-acrylic acid), poly (acrylic acid-co-styrene) or their salts; maleic acid, styrene or maleic anhydride copolymers or their salts; polyacylonitriles; polyalkyl acrylate; polyalkyl methacrylate; polyvinyl methyl ether; polyvinyl ethyl ether; polyvinyl acetate; polyvinyl alcohol; poly-N-vinylpyrrolidone; polyvinyl methyl ketone; poly(4-vinylphenol); oxazoline polymer; polyalkyleneimine; hydroxyethylcellulose; polyacetal; glyoldyl ether; glycoside; carboxylic acid ester of polyhydric alcohol; bile acid or its salt, ester or amide; cyclodextrin; phosphorus compound: unsaturated carboxylic acid ester; or an ionic surface- or interface-active compound; wherein the organic complexing ligand is a mixture of tert-butyl alcohol and from about 2 to about 98 mole %, based on the total amount of organic complexing ligand, of one of methylethylketone, 3,3- dimethoxy-2-butanone and cyclopentanone.

6. The double-metal cyanide catalyst according to claim 5, wherein the double-metal cyanide compound is zinc hexacyanocobaltate (III).

7. The double-metal cyanide catalyst according to claim 5, wherein the double-metal cyanide catalyst comprises from about 2 to about 98 wt. %. based on the total weight of the double-metal cyanide catalyst, of functionalized polymer.

8. The double-metal cyanide catalyst according to claim 5, wherein the functionalized polymer is a polyether.

9. A process for preparing a double-metal cyanide catalyst comprising:
   (a) reacting, in aqueous solution,
      (I) at least one metal salt,
      (II) with at least one metal cyanide salt, in the presence of
      (III) an organic complexing ligand which lea mixture of tert-butyl alcohol and from about 2 to about 98 mole %, based on the total amount of organic complexing ligand, of a one of methylethylketone, 3,3-dimethoxy-2-butanone and cyclopentanone; and, optionally, butanone and cyclocientanone; and, optionally,
   (b) adding at least one functionalized polymer to the reactive mixture to form a suspension comprising DMC catalyst.

10. The process according to claim 9, comprising the steps of:
   (c) isolating the catalyst from the suspension;
   (d) washing the isolated catalyst; and
   (e) drying the isolated catalyst.

11. The process according to claim 9, wherein the functionalized polyol is a polyother.

12. The catalyst produced according to the process of claim 9.

13. A double-metal cyanide catalyst comprising:
   a) at least one double-metal cyanide compound;
   b) at least one organic complexing ligand; and
   a) optionally, at least one functionalized polymer;
wherein the organic complexing ligand is a mixture of tert-butyl alcohol and from about 2 to about 98mole %, based on the total amount of organic complexing ligand, of cyclopentanone.

14. The double-metal cyanide catalyst acocording to claim 13, wherein the double-metal cyanide compound is zinc hexacyanocobaltate (III).

15. The double-metal cyanide catalyst according to claim 13, wherein the double-metal cyanide catalyst comprises from about 2 to about 98 wt. %, based on the total weight of the double-metal cyanide catalyst, of functionalized polymer.

16. A double-metal cyanIde catalyst comprising:
   a) at least one double-metal cyanide compound;
   b) at least one organic compioxing ligand; and
   c) optionally, at least one functionalized polymer;
wherein the organic complexing ligand is a mixture of tert-butyl alcohol and from about 2 to about 98 mole %, based on the total amount of organic complexing ligand of 3,3-dimethoxy-2-butanone.

17. The double-metal cyanide catalyst according to claim 16, the double-metal cyanide compound is zinc hexacyanocobaltate (III).

18. The double-metal cyanide catalyst according to claim 16, wherein the double-metal cyanide catalyst comprises from about 2 to about 98 wt. %, based on the total weight of the double-metal cyanide catalyst, of functionalized polymer.

* * * * *